Dec. 15, 1959     L. E. HARRISON     2,916,946
AUTOMATIC THROTTLE CONTROL MECHANISMS
FOR AUTOMOTIVE VEHICLES
Filed Nov. 6, 1958
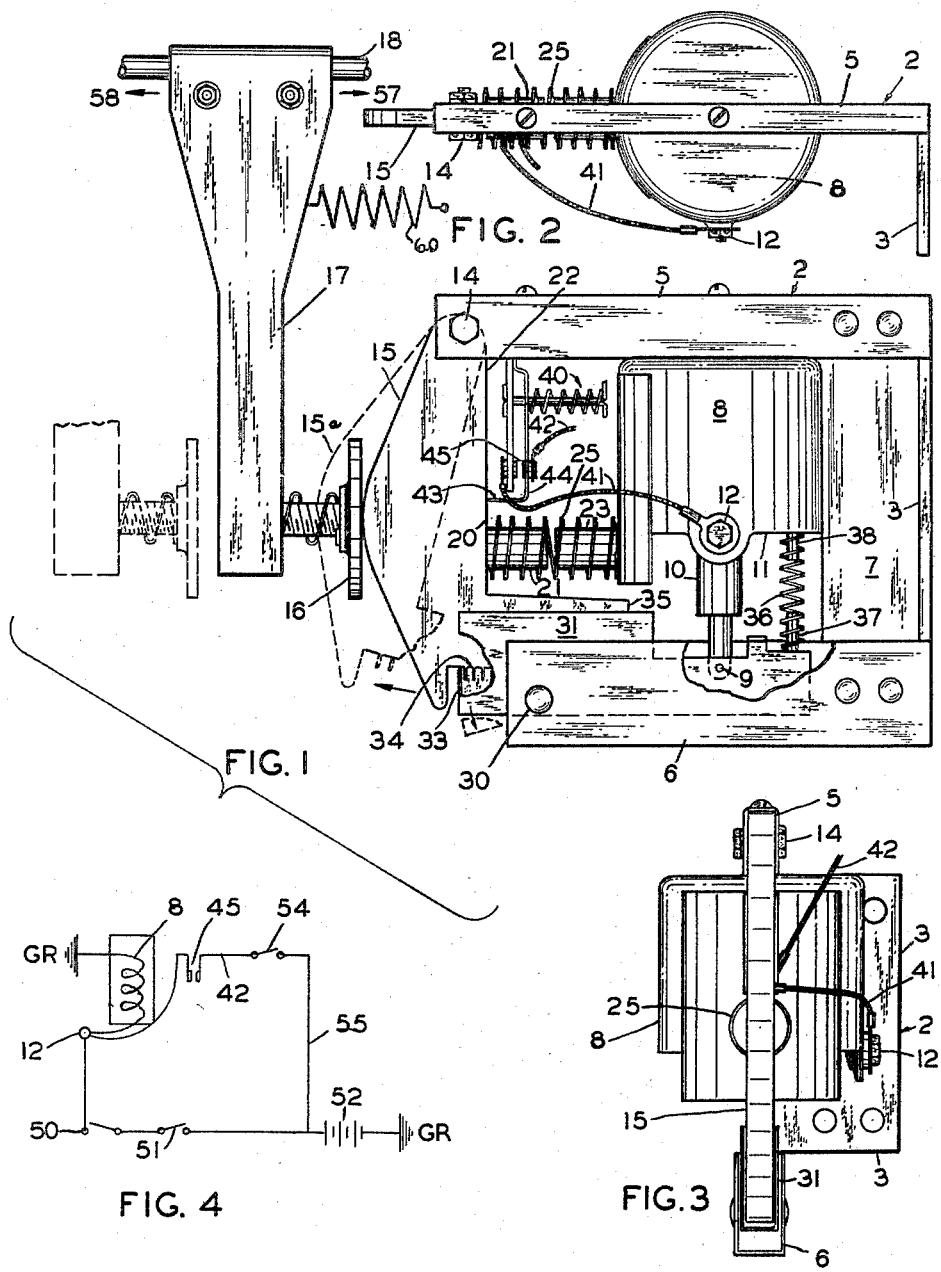
INVENTOR.
Lester E. Harrison
BY
Scott L. Norvell
atty

United States Patent Office 2,916,946
Patented Dec. 15, 1959

2,916,946

AUTOMATIC THROTTLE CONTROL MECHANISMS FOR AUTOMOTIVE VEHICLES

Lester E. Harrison, Casa Grande, Ariz.

Application November 6, 1958, Serial No. 772,212

2 Claims. (Cl. 74—513)

This invention pertains to automatic throttle control mechanisms for motive vehicles.

Heretofore many suggestions have been made concerning devices which will control the speed of an automobile engine independently of the foot pedal or throttle found on most automobiles. The main objection to most of these devices has been their complication and excessive cost.

One of the objects of this invention is to provide a device which will work in connection with a automobile engine and will hold the throttle of the carburetor open at predetermined positions so that it is unnecessary for the operator to hold the throttle pedal down at all times during operation.

A second object is to provide a mechanism which may be installed on the automobile operating machinery and connected to the throttle pedal, the brake pedal, an independenlty operated switch, and the automobile electrical system so that whenever the automobile is operating with the throttle pedal set at a definite position the device may be placed in operation by closing said switch and it will then hold the throttle in the position determined by the operator's foot until it is tripped or released by any one of several means, whereupon it will return the throttle mechanism to normal condition.

Another object of the device is to provide a mechanical means for engaging the throttle operating lever of the automobile engine to hold it at a predetermined position together with mechanism to release said hold electrically whenever desired by the operator.

I attain the foregoing objects by means of the device, parts and combinations of parts illustrated in the accompanying drawings, in which—

Figure 1 is a side elevational view of the electro mechanical device for engaging the throttle operative rod and for releasing it when desired;

Figure 2 is a plan view of said device;

Figure 3 is a front end view of the device shown in Figure 1; and

Figure 4 is the electrical wiring diagram used in connecting the device to an automobile.

Similar numerals refer to similar parts in the several views.

It is to be understood that this device is to be used on automotive vehicles having internal combustion engines including throttles, or the equivalent thereof, to control the speed of the vehicle. In cases where a carburetor is not used on the engine this device may be used on whatever mechanism represents the equivalent of the carburetor customarily used.

The base frame 2 of the control device is U-shaped and is ordinarily positioned in the engine compartment of the automobile in the proximity of the control rod or lever which operates the carburetor pursuant to movement imparted by a pedal or throttle in the driving compartment. The body is attached to any convenient part of the motor or other mechanism in said compartment by the flange 3. The base frame 2 is somewhat U-shaped and has two horizontal arms 5 and 6 joined by a vertical member 7 which is attached to mounting flange 3.

On the underside of the top arm 5 an electrical solenoid 8 is attached so that its armature 10 is directed downward toward the under arm 6. The lower end of this armature is pivotally attached to latch lever 31 by pin 9. As shown, it is to be understood that the solenoid winding is within the outer case 11, shown in the drawings, and that the inner end of the winding is grounded to the frame and that the outer or live end of the winding is brought out and attached to the insulated bolt 12.

At the outer end of the top arm 5 there is a pivot bolt 14 which pivotally holds the operative nose piece 15. This piece has a front edge which is somewhat rounded and adapted to contact the throttle rod holding pad 16. This pad is adjustably secured to a bracket 17 which is attached at its upper end to the throttle control rod 18.

The inner edge 20 of nose piece 15 is provided with a spring positioning lug 21 which is disposed at some distance from the pivot end 22. Opposite lug 21 there is a stationary spring holding lug 23 supported on the case cover 11 of the solenoid 8. A spring 25 is supported on lugs 21 and 23 and is of the open type and arranged so that it normally pushes outward on nose piece 15 and brings it into contact with the pad 16.

On the lower leg 6 of frame 2 there is a pivot bolt 30 which pivotally supports a tilting latch 31. At the forward end of this latch there is an upwardly extending detent 33 which is disposed to engage any of the teeth 34 on the lower edge of the rearwardly extending portion 35 of nose piece 15. When this latch is tilted so that its forward end is raised the detent engages the teeth and when it is tilted with its forward end downward the teeth are released from the detent. A spring 36 operates between the inner end of latch 31 and is held in place by a pin 37. The upper end of spring 36 is held in place by pin 38 on solenoid cover 11. This spring normally urges the inner end of latch 31 downward and therefore, because of the intermediate position of pivot pin 30, raises the front end of the latch and therefore the detent 33 normally engages teeth 34 on nose piece 15. Energizing the solenoid 8 raises the armature 10 and releases the detent from the teeth 34. On the upper arm 5 of frame 2 there is a switch generally indicated by numeral 40. This switch is connected in circuit with the solenoid by the conductor 41 and the lead 42 from this switch is connected to the stop light side of the stop light switch on the automobile. A contact finger 43 on the switch arm 44 is normally urged forward by a spring 25 to close the contact points 45 of the switch. This finger however is positioned to contact the back edge 22 of nose piece 15 when the nose piece is swung rearward toward the solenoid 8.

In use after the body 2 has been installed in the proper position in the engine compartment so that the nose piece 15 abuts the plate 16 on throttle rod 18 wiring of the device to the operating control of the automobile is made by connecting the live end 12 of the solenoid winding through a push button 50 and through the ignition switch 51 to the live post of battery 52. It is to be understood that the other post of the battery is grounded. A second connecting wire runs from the bolt 12 through connector wire 41 to the switch 40 and thence to the stop light switch 54 on the brake pedal of the automobile. From this switch the connecting wire 55 leads to the live post of the battery 52.

With the device connected as above the car is driven so that a desired speed is attained and then button 50 is pressed. This causes the solenoid to raise the armature 10 and the rear end portion of latch 31. Thus the detent 33 releases from teeth 34 and the nose piece 15 swings outward as indicated by dotted lines 15a until it is stopped by contact with the button 16. It is to be understood that the button 16 will then be in a position corresponding to the speed of the automobile as governed by the speed of the motor which, in turn, is determined by the position of throttle rod 18. Contact of the nose piece will then hold and determine the position of button 16 because the current provided by push button 50 is only momentary the nose piece will take the position shown in Figures 1 and 3 and the nose piece will be locked in this position by the detent 33 which quickly returns to the normal holding position as shown particularly in Figure 1.

The car will then be held at the corresponding speed based on the position of throttle rod 18 when button 50 was pressed. This situation, of course, does not make allowance for variations in the inclination of the road or variations in wind pressure. When the action of solenoid 8 released the detent 33 spring 25 forces the nose piece out as far as it would go until stopped by contact with button 16.

Should the operator now wish to disconnect the device from the throttle rod it is only necessary for him to either press button 50 to energize solenoid 8 or to press the brake sufficient to close the stop light switch 54. When the solenoid 8 is energized it again raises the rear end portion of latch 31 thereby disconnecting the detent 33 from any of the teeth 34. Since the throttle rod 18 is always under the urge of the throttle spring 60 in the direction of arrow 57, the button 16 pushes the nose piece 15 in the direction 57 and is strong enough to overcome the urge of spring 25. Since the urge of the throttle rod tends to force the nose piece back as far as it will go it moves the nose piece to the disconnect position shown in Figure 1. In this position the rear face 22 of the nose piece presses against the finger 43 of switch 40 and opens the contact point 45. Therefore all current from the battery is disconnected and no current flows through the solenoid after the stop light switch 54 on the brake pedal is operated. In other words, to reactivate the device it is necessary to close push button switch 50. This is a safety feature that prevents waste of current and the possibility of burning out the solenoid by unintentional flow of current through the solenoid after switch 45 has been opened, and brake pedal is depressed.

From the foregoing it will be noted that the single solenoid 8 is used first to release the nose piece from the detent 33 so that spring 25 will force it into contact with the button plate 16 when the throttle rod 18 has been pushed forward in the direction of arrow 58, and again to disconnect detent 33 and to permit the throttle rod spring to push the button 16 to the rear so that the nose piece returns to neutral inoperative position.

It should further be understood that the throttle rod 16 is normally urged rearwardly in the direction of arrow 57 by a spring shown diagrammatically at 60. A throttle pedal (not shown) pressed by the operator of the vehicle urges rod 16 forward in the direction 58 to open the throttle and increase the engine speed. Thus, when the nose piece 15 is released to "set" the speed of the engine, the pad 16 is pushed forward and there is no throttle rod push against the urge of spring 25. Conversely, when it is desired to disconnect the nose piece from latch 31, the urge of the operator on the pedal of throttle rod 16 is absent and spring 60 overcomes the urge of spring 25 so that when latch 31 disengages from the teeth 34 on nose piece 15 the nose piece swings rearward to inoperative position as pushed by pad 16. Since the release is momentary the detent 33 reengages teeth 34 and the nose piece is again held in released or non-holding position.

I claim:

1. In an automotive vehicle having a body, a driver's compartment therein, an electrical battery, an engine having a throttle, a throttle control rod extending from the engine to the driver's compartment, and throttle return spring means normally urging the throttle control rod towards the closed position of the throttle, an automatic throttle control mechanism comprising a control mechanism supporting frame, a nose piece having one end pivotally attached to said frame and having a plurality of latch teeth at the opposite end portion and having an outwardly curved nose piece, connecting means having a first end portion attached to said throttle rod adapted to move therewith and a second end portion adapted to be in operating relationship with said curved nose piece, a spring on said frame normally urging said nose piece towards said second end portion of said connecting means, lever means pivotally mounted on said frame, said lever means having a pawl on one end adapted to engage said latch teeth on said nose piece, a spring on said frame urging said pawl carrying lever means towards said latch teeth, a solenoid on said frame having an armature, one end portion thereof being pivotally attached to said lever means and adapted to move said lever means to a position disengaging the pawl portion from said teeth on said nose piece when the solenoid is energized, a first electrical circuit for energizing said solenoid connected to said battery having a normally open switch in the driving compartment of said automotive vehicle, a second electrical circuit for energizing said solenoid connected to said battery including a normally closed electric switch mounted on said frame and adapted to be opened by said nose piece when it is pivoted to substantially its furthermore locus due to the influence of said throttle return spring means when it moves the throttle control rod and thereby said connecting means.

2. In an automotive vehicle having a body, a driver's compartment therein, an electrical battery, an engine having a throttle, a throttle control rod extending from the engine to the driver's compartment, and throttle return spring means normally urging the throttle control rod towards the closed position of the throttle, an automatic throttle control mechanism, comprising a control mechanism U-shaped supporting frame having upper and lower horizontal legs joined at their rear ends by a vertical connecting member, an L-shaped nose piece having one end pivotally attached to the end portion of the upper leg and having a plurality of latch teeth at the opposite end portion and having an outwardly curved nose piece along its forward edge, connecting means having a first end portion attached to said throttle rod adapted to move therewith and a second end portion being adapted to be in operating relationship with said curved nose piece, a spring on said frame normally urging said nose piece towards said second end portion of said connecting means, lever means pivotally mounted on the lower leg of said frame, said lever means having a pawl on one end adapted to normally engage said latch teeth on said nose piece, a spring on said frame urging said pawl carrying lever means towards said latch teeth, a solenoid on said frame having an armature, one end portion thereof being pivotally attached to said lever means and adapted to move said lever means to a position disengaging the pawl portion from said teeth on said nose piece when the solenoid is energized, a first electrical circuit for energizing said solenoid connected to said battery having a normally open switch in the driving compartment of said automotive vehicle, a second normally closed electrical circuit for energizing said solenoid connected to said battery including an electrical switch mounted on said frame and adapted to be opened by said nose piece when it is pivoted to substantially its furthermost locus due to the influence of said throttle return spring means when it moves the throttle control rod and thereby said connecting means.

References Cited in the file of this patent

UNITED STATES PATENTS

| | | |
|---|---|---|
| 2,487,606 | Smith | Nov. 8, 1949 |
| 2,802,553 | Roggenstein et al. | Aug. 13, 1957 |